(12) United States Patent
Stoller et al.

(10) Patent No.: US 7,365,307 B2
(45) Date of Patent: Apr. 29, 2008

(54) SIGMA/POROSITY TOOLS WITH NEUTRON MONITORS

(75) Inventors: Christian Stoller, Princeton Junction, NJ (US); Peter Wraight, Skillman, NJ (US); Robert A. Adolph, Pennington, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 19 days.

(21) Appl. No.: 11/307,630

(22) Filed: Feb. 15, 2006

(65) Prior Publication Data

US 2006/0226351 A1   Oct. 12, 2006

Related U.S. Application Data

(60) Provisional application No. 60/657,180, filed on Feb. 28, 2005.

(51) Int. Cl.
*G01V 5/10* (2006.01)
(52) U.S. Cl. .................................... 250/269.2
(58) Field of Classification Search ............ 250/269.2, 250/269.5, 269.6
See application file for complete search history.

(56) References Cited

U.S. PATENT DOCUMENTS

| | | | |
|---|---|---|---|
| 2,345,119 A | 3/1944 | Hare |
| 2,475,137 A | 7/1949 | Herzog |
| 2,648,780 A | 8/1953 | Herzog |
| 2,761,977 A | 9/1956 | McKay |
| 2,763,788 A | 9/1956 | Herzog |
| 2,934,652 A | 4/1960 | Caldwell et al. |
| 3,073,958 A | 1/1963 | Youmans |
| 3,321,625 A | 5/1967 | Wahl |
| 3,321,627 A | 5/1967 | Tittle |
| 3,435,217 A | 3/1969 | Givens |
| 3,453,433 A | 7/1969 | Alger et al. |
| 3,483,376 A | 12/1969 | Locke et al. |
| 3,491,238 A | 1/1970 | Allen |
| 3,509,346 A | 4/1970 | Mills, Jr. et al. |
| 3,566,117 A | 2/1971 | Tixier |
| 3,566,118 A | 2/1971 | Peters |
| 3,662,173 A | 5/1972 | Youmans |

(Continued)

FOREIGN PATENT DOCUMENTS

GB   862434   3/1961

(Continued)

OTHER PUBLICATIONS

Wilson, Robert D., "Bulk Density Logging with High-Energy Gammas Produced by Fast Neutron Reactions with Formation Oxygen Atoms," Nuclear Science Symposium and Medical Imaging Conference Record, 1995., 1995 IEEE (Oct. 21-28, 1995) vol. 1, pp. 209-213.

*Primary Examiner*—Constantine Hannaher
(74) *Attorney, Agent, or Firm*—Kevin McEnaney; Bryan White; Jaime Castos

(57) ABSTRACT

A tool for formation logging includes a support configured for movement in a borehole; a neutron source disposed on the support; a neutron monitor disposed on the support and configured to monitor an output of the neutron source; a gamma-ray detector disposed on the support and spaced apart from the neutron source; and a shielding material disposed between the gamma-ray detector and the neutron source.

31 Claims, 4 Drawing Sheets

U.S. PATENT DOCUMENTS

| | | | |
|---|---|---|---|
| 3,789,219 A | 1/1974 | Wilson | |
| 3,971,935 A | 7/1976 | Nelligan | |
| 4,005,200 A * | 1/1977 | Utsumi et al. | 514/178 |
| 4,048,495 A | 9/1977 | Ellis | |
| 4,055,763 A | 10/1977 | Antkiw | |
| 4,122,339 A * | 10/1978 | Smith et al. | 250/264 |
| 4,122,340 A | 10/1978 | Smith, Jr. et al. | |
| 4,152,590 A | 5/1979 | Smith, Jr. et al. | |
| 4,379,228 A | 4/1983 | Allen | |
| 4,381,449 A | 4/1983 | Smith, Jr. | |
| 4,387,302 A * | 6/1983 | Givens | 250/269.2 |
| 4,409,481 A | 10/1983 | Smith, Jr. et al. | |
| 4,436,996 A | 3/1984 | Arnold et al. | |
| 4,446,368 A | 5/1984 | Koenn et al. | |
| 4,454,420 A | 6/1984 | Smith, Jr. | |
| 4,529,877 A | 7/1985 | Arnold | |
| 4,568,829 A | 2/1986 | Ruckebusch | |
| 4,618,765 A | 10/1986 | Sonne | |
| 4,631,405 A | 12/1986 | Smith, Jr. | |
| 4,645,926 A | 2/1987 | Randall | |
| 4,691,102 A | 9/1987 | Schultz et al. | |
| 4,760,252 A | 7/1988 | Albats et al. | |
| 4,814,611 A | 3/1989 | Moake | |
| 4,947,040 A | 8/1990 | Mahdavi et al. | |
| 5,235,185 A * | 8/1993 | Albats et al. | 250/269.5 |
| 5,313,504 A | 5/1994 | Czirr | |
| 5,377,105 A | 12/1994 | Smith | |
| 5,390,115 A | 2/1995 | Case et al. | |
| 5,434,408 A | 7/1995 | Smith, Jr. et al. | |
| 5,459,314 A | 10/1995 | Plasek | |
| 5,539,225 A | 7/1996 | Loomis et al. | |
| 5,699,246 A | 12/1997 | Plasek et al. | |
| 5,767,510 A | 6/1998 | Evans | |
| 6,032,102 A | 2/2000 | Wijeyesekera et al. | |
| 6,376,838 B1 | 4/2002 | Odom | |
| 6,389,367 B1 | 5/2002 | Plasek | |
| 6,495,837 B2 | 12/2002 | Odom et al. | |
| 6,639,210 B2 | 10/2003 | Odom et al. | |
| 6,703,606 B2 | 3/2004 | Adolph | |
| 6,754,586 B1 | 6/2004 | Adolph et al. | |
| 2003/0178560 A1 | 9/2003 | Odom et al. | |
| 2004/0222368 A1 * | 11/2004 | Odom et al. | 250/269.2 |

FOREIGN PATENT DOCUMENTS

| | | |
|---|---|---|
| GB | 1405299 | 9/1975 |
| GB | 2087072 | 5/1982 |
| GB | 2117901 | 10/1983 |
| WO | WO 2004/081605 A2 | 9/2004 |

* cited by examiner

SIGMA/POROSITY TOOLS WITH NEUTRON MONITORS

CROSS-REFERENCE TO RELATED APPLICATIONS

This invention claims priority of U.S. Provisional Application Ser. No. 60/657,180, filed on Feb. 28, 2005, which is incorporated by reference in its entirety. This document is related to co-pending applications, entitled: "Correction of Gamma Ray Responses", and "Apparatus and Methods for Interlaced Density and Neutron Measurements", both filed concurrently with this document and assigned to the assignee of the present invention.

BACKGROUND OF INVENTION

1. Field of the Invention

The invention relates to well logging with nuclear tools. In particular, it relates to apparatus and methods for the determination of the thermal neutron capture cross section of the borehole and the formation surrounding the borehole. In addition, the invention also relates to apparatus, and methods for determining formation porosity.

2. Background Art

The characteristics of geological formations are of significant interest in the exploration and production of subsurface water and mineral deposits, such as oil and gas. Many characteristics, such as the hydrocarbon volume, porosity, lithology, reservoir location, and permeability of a formation, may be deduced from certain measurable quantities. Among these quantities are: density, porosity, photoelectric factor (Pe), hydrogen index, salinity, and thermal neutron capture cross section (Sigma). These quantities are typically measured by logging-while-drilling (LWD) or wireline tools.

A typical logging tool carries a source that radiates or emits energy into the formation and one or more detectors that can sense the resulting interactions of the radiation. Detected signal data are typically transmitted uphole, temporarily stored downhole for later processing, or combined in both techniques, to evaluate the geological formation from which the data was gathered.

The determination of the formation capture cross section (Sigma) allows the determination of the oil saturation of the formation, if the salinity of the formation water, the capture cross section of the formation matrix and the formation porosity are known. Sigma may be determined from the decay times of the gamma rays produced following the capture of thermal neutrons by nuclei in the formation. U.S. Pat. No. 3,379,882 issued to Youmans discloses methods for determining formation thermal decay time or pulsed-neutron capture cross section. The method involves irradiating a formation from a borehole tool with a short burst of fast neutrons (pulsed neutrons) and measuring the decline rate of slow neutrons or gamma rays which result from thermal neutron capture in the formation. These measurements provide an indication of the identity of the nuclei of the materials present in the formation.

In its simplest form, a Sigma logging tool consists of a pulsed neutron generator and one gamma-ray detector. The gamma-ray detector uses two or more time gates following the burst to determine the characteristic die-away time of the capture gamma-ray after the end of the burst. The die-away time is inversely related to the apparent capture cross section of the formation as shown in equation (1).

$$\Sigma = \frac{4550}{T} \quad (1)$$

where $\Sigma$ is the macroscopic formation capture cross section in capture units (c.u.) and $\tau$ is the time constant of the time decay in microseconds, which is assumed to be exponential:

$$N = N_0 \cdot e^{-t/\tau} \quad (2)$$

The lifetime curve of thermal neutrons is a composite of captures occurring in the borehole including casing and surrounding cement in cased holes, in the porous invaded zone surrounding the borehole, and in the uninvaded formation beyond. All these capture processes occur with different decay times, and it is possible to decipher the formation decay process from the composite capture processes. A typical approach is to monitor the capture process with two or more time windows after the neutron burst. The two or more time window measurements may then be used to derived the desired decay times. A preferred method for making a neutron lifetime measurement, for quantitative determination of formation characteristics, is to observe the complete decline curve of the neutron induced radiation (thermal neutrons or capture gammas) from the termination of the neutron pulse to the disappearance of all induced radiation (excluding the activation or background gammas).

A refinement of the technique consists of using dual bursts, i.e. two bursts of unequal length (duration) and measuring the decay times after each of the bursts. This technique allows an excellent separation between the apparent borehole and the formation decay times. For detailed discussion of this technique, see U.S. Pat. No. 4,721,853 issued to Wraight and assigned to the assignee of the present invention.

Modern Sigma logging tools use at least two gamma-ray detectors at two different axial spacings from the pulsed neutron source. The use of two different spacings makes it possible to correct for environmental effects, which influence the measured (apparent) sigma. Specifically, the detector with the shorter spacing is more susceptible to the capture cross section of the borehole (borehole fluid and if present casing and cement) and also more sensitive to the effect of neutron diffusion (as opposed to neutron capture) on the apparent neutron decay time. Therefore, a comparison between signals detected by the short spacing detector and the long spacing detector can provide a compensation for these effects.

The presence of two detectors also makes it possible to determine count rate ratios. The ratios can be computed either between the total average count rates of the two detectors, between the inelastic count rates or between the capture count rates. These ratios are inversely related to the formation porosity, i.e. the ratio of the short-spacing and long-spacing detector count rates will decrease with increasing formation porosity. Therefore, the ratios can be used to determine the porosity of the formation in a manner similar to the neutron porosity measurement of the CNL tools. The use of a ratio, while reducing some of the environmental effects on the final answer, is largely dictated by the fact that the neutron output of the pulsed generator is not adequately known. In addition, the output of a pulsed neutron generator changes as a function of time, temperature and age of the generator.

SUMMARY OF INVENTION

One aspect of the invention relates to tools for formation logging. A tool in accordance with one embodiment of the invention includes a support configured for movement in a borehole; a pulsed neutron source disposed on the support; a neutron monitor disposed on the support and configured to monitor the output of the neutron source; a gamma-ray detector disposed on the support and spaced apart from the neutron source; and a shielding material disposed between the gamma-ray detector and the neutron source.

Another aspect of the invention relates to methods for formation logging. A method in accordance with one embodiment of the invention includes emitting neutrons into a formation from a neutron source disposed on a logging tool in a borehole; monitoring, using a neutron monitor disposed on the logging tool proximate the neutron source, the output of the neutrons emitted by the neutron source; measuring, using a gamma-ray detector disposed on the logging tool and spaced apart from the neutron source, count rates of gamin a rays scattered by the formation as a result of interactions with the neutrons emitted by the neutron source; normalizing the measured count rates based on the output of the neutrons as monitored by the neutron monitor.

Other aspects and advantages of the invention will be apparent from the following description and the appended claims.

DETAILED DESCRIPTION

Embodiments of the invention relate to methods for determining properties (e.g., Sigma and porosity) of subsurface formations by using a logging tool that includes a pulsed neutron generator having a monitoring device (i.e., a neutron monitor) that monitors the neutron output of the generator. In accordance with embodiments of the invention, neutron monitors are used to determine the average and/or instantaneous neutron output of the generator. A tool in accordance with embodiments of the invention may include only a single gamma-ray detector, without relying on two detectors for environmental effects correction. Gamma-ray detectors on such tools may be used to determine the gamma-ray die-away, which is used to determine Sigma, and the count rates, which are used for the estimation of formation porosity. In accordance with embodiments of the invention, a logging tool may use a dual-burst pulsing sequence, or more complex multiple bursting sequence, which makes it possible to correct the apparent formation properties (e.g., sigma), which are susceptible to interference by borehole signals.

Figure 1:
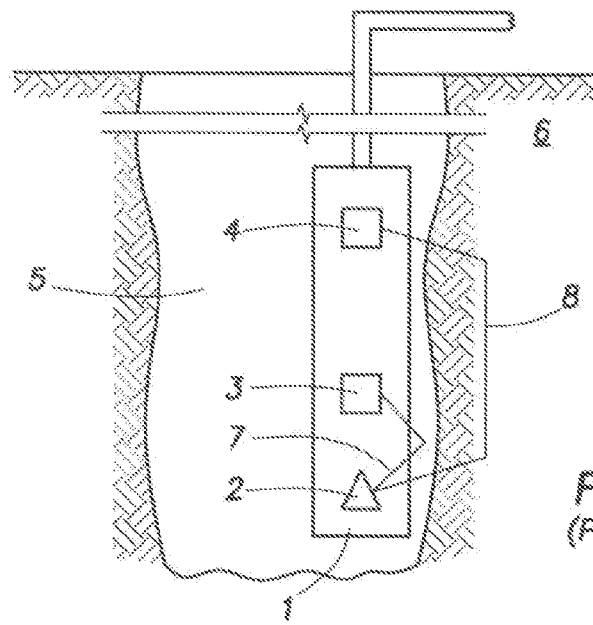
FIG. 1 shows a schematic of a conventional nuclear logging tool disposed in a borehole.

As noted above, a modern Sigma logging tool uses at least two gamma-ray detectors at two different axial spacings from the pulsed neutron source. FIG. 1 shows a schematic of a basic layout for a two detector sigma logging tool disposed in a borehole. The logging tool 1 consists of a neutron source 2, a short spaced (SS) detector 3 and a long spaced (LS) detector 4. The logging tool is disposed in a borehole 5 penetrating a formation 6. Neutrons emitted from the source 2 go into the borehole 5 and formation 6, where they interact with matters in the formation and are scattered. Some of scattered radiation is subsequently detected by the detectors. The SS detector 3 is more sensitive to the region close to the tool 7, i.e., more susceptible to the capture cross section of the borehole (borehole fluid and if present casing and cement) and also more sensitive to the effect of neutron diffusion (as opposed to neutron capture) on the apparent neutron decay time. In contrast, the LS detector 4 detects mostly radiation 8 scattered from the formation 6 and, therefore, is less sensitive to effects of tool standoff. Therefore, the use of two different spacings for the two detectors makes it possible to correct for environmental effects that may influence the measured (apparent) sigma.

In addition, the presence of two detectors makes it possible to determine count rate ratios. The ratios can be computed either between the total average count rates of the two detectors, between the inelastic count rates or between the capture count rates. These ratios are inversely related to the formation porosity, i.e. the ratio of the short-spacing and long-spacing detector count rates will decrease with increasing formation porosity. Therefore, the ratios can be used to determine the porosity of the formation in a manner similar to the neutron porosity measurement of the compensated neutron logging tools (such as that sold under the trade name of CNL® by Schlumberger).

As noted above, the use of a ratio, while reducing some of the environmental effects on the final answer, is largely dictated by the fact that the neutron outputs of a pulsed generator are not adequately known. In addition, the output of a pulsed neutron generator changes as a function of time, temperature and age of the generator.

Embodiments of the invention overcome the problems associated with the unknown and unstable neutron outputs from a generator by using a neutron monitor to measure the outputs of a neutron generator. The use of a neutron monitor allows the determination of the absolute count rates of a gamma-ray detector. Count rates detected by a gamma-ray detector strongly correlate with formation porosities. Formation porosity is typically a monotonic function of the reciprocal of the count rate. Accordingly, formation porosities can be determined from the normalized gamma-ray count rates. Methods for calibrating a pulsed neutron generator using a monitor are disclosed, for example, in U.S. Pat. No. 6,754,586 issued to Adolph et al. This patent is assigned to the assignee of present invention and is incorporated by reference in its entirety.

Figure 3:
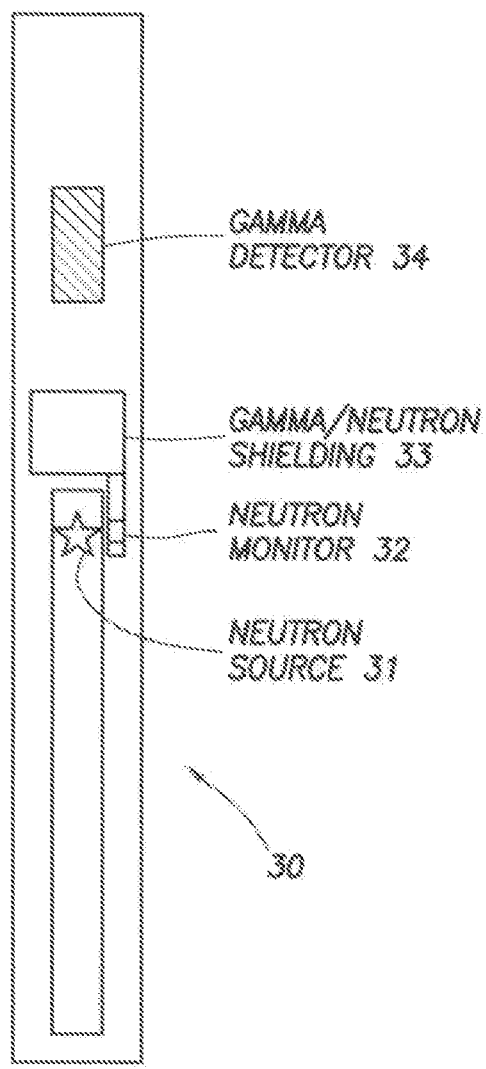
FIG. 3 shows a logging tool having a neutron source and a monitor in accordance with one embodiment of the invention.

FIG. 3 shows a simple tool in accordance with one embodiment of the invention. As shown, a tool 30 consists of a pulsed neutron generator 31, a neutron monitor 32 mounted close to the source, a gamma-ray detector 34 (preferably a scintillation detector) and neutron and gamma-ray shielding 33 between the neutron source 31 and the gamma-ray detector 34. The shielding material, for example, may be cadmium, boron or boron-loaded materials. The pulsed neutron generator 31 may use a D-T reaction to produce 14 MeV neutrons, which are emitted virtually isotropically from the target. The pulsed neutron generator 31 may also use any similar generator know in the art, such as a D-D minitron.

Figure 4A:
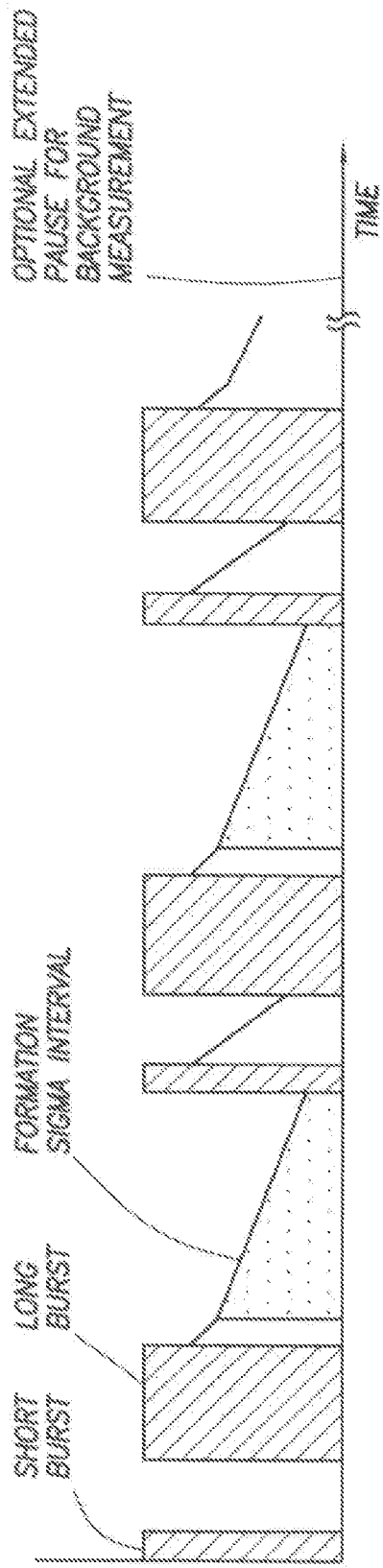
FIGS. 4A and 4B show two pulse schemes that may be used with embodiments of the invention.
Figure 4B:
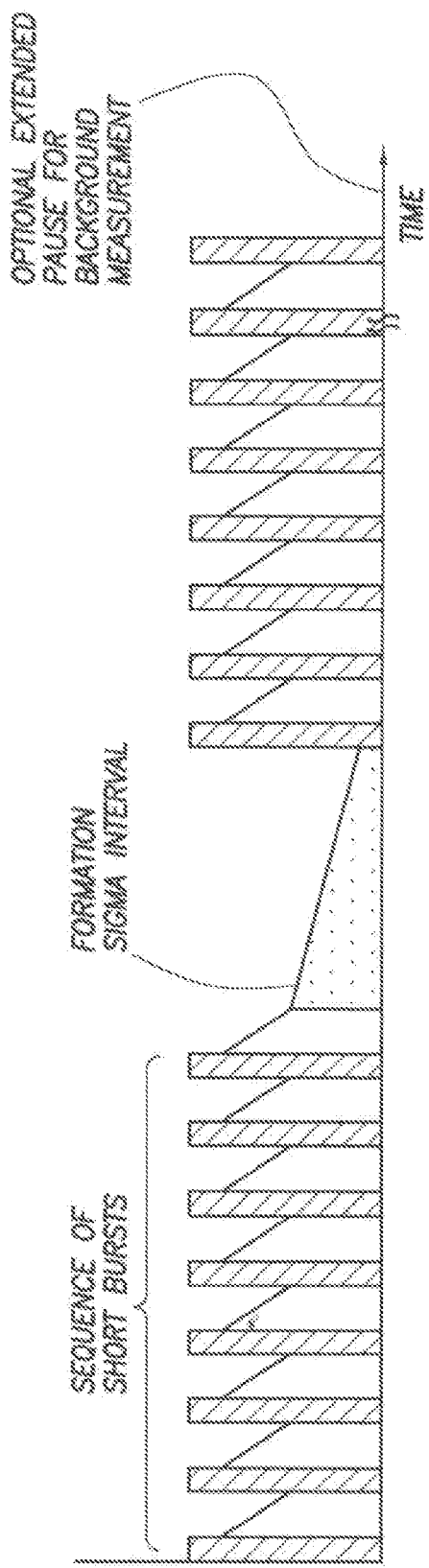

In accordance with embodiments of the invention, the neutrons may be emitted in a sequence of short and long bursts, as illustrated in FIG. 4. As shown in FIG. 4A. the short bursts, for example, may have a duration of about 10 to 40 µs, and the long burst, for example, may have a duration of about 60 to 250 µs. Optionally, the long burst may be replaced by a series of tightly spaced short bursts followed by a longer neutron free interval, as illustrated in FIG. 4B. With either pulsing scheme, the short bursts provide measurements predominantly of borehole sigma, while the long burst provide measurements predominately of formation sigma. In both pulsing schemes, a series of burst sequences may be followed by a burst-free interval of several milliseconds. This burst-free interval can be used to determine any long-lived background that needs to be subtracted for an accurate sigma and porosity determination.

The space between the neutron source and the gamma-ray detector may be partially or completely filled with shielding material. This material is intended to reduce the direct neutron flux from the source to the detector and also to prevent gamma-rays originating near the source inside and outside the tool from traveling to the detector. Preferred materials for the shielding, for example, include tungsten (shielding of high energy neutrons and gamma-rays), materials containing a high concentration of hydrogen (e.g., Ti hydride or organic compounds) to moderate intermediate energy neutrons (neutrons with an energy below several MeV), and materials containing a high concentration of 10B (either using natural boron, or boron enriched with 10B), cadmium or other neutron absorbers. The shielding may be composed of a single material or a mix of the different shielding materials. Alternatively, the shield may comprise multiple layers of the above materials to optimize the shielding performance.

In preferred embodiments, the gamma-ray detector 34 is placed at a distance between 8 and about 40 in. from the neutron source 31. A gamma ray detector 34 may comprise any suitable type detector, such as NaI, BGO, CsI, anthracene, etc., see U.S. Pat. Nos. 4,647,781 and 4,883,956. In preferred embodiments, the gamma-ray detector may be an inorganic scintillator (NaI(Tl)) or any other scintillator suitable for detecting gamma-rays in a logging environment. The scintillator is coupled to a photomultiplier (not shown) suited for well logging applications, as well known in the art. In the preferred embodiments, the gamma-ray detector is operated in plateau mode. However, in an alternate implementation, the detector could be used to perform gamma-ray spectroscopy in addition to measuring raw count rates. The gamma-ray spectra may be used to derive formation lithology using any methods known in the art.

Figure 6:
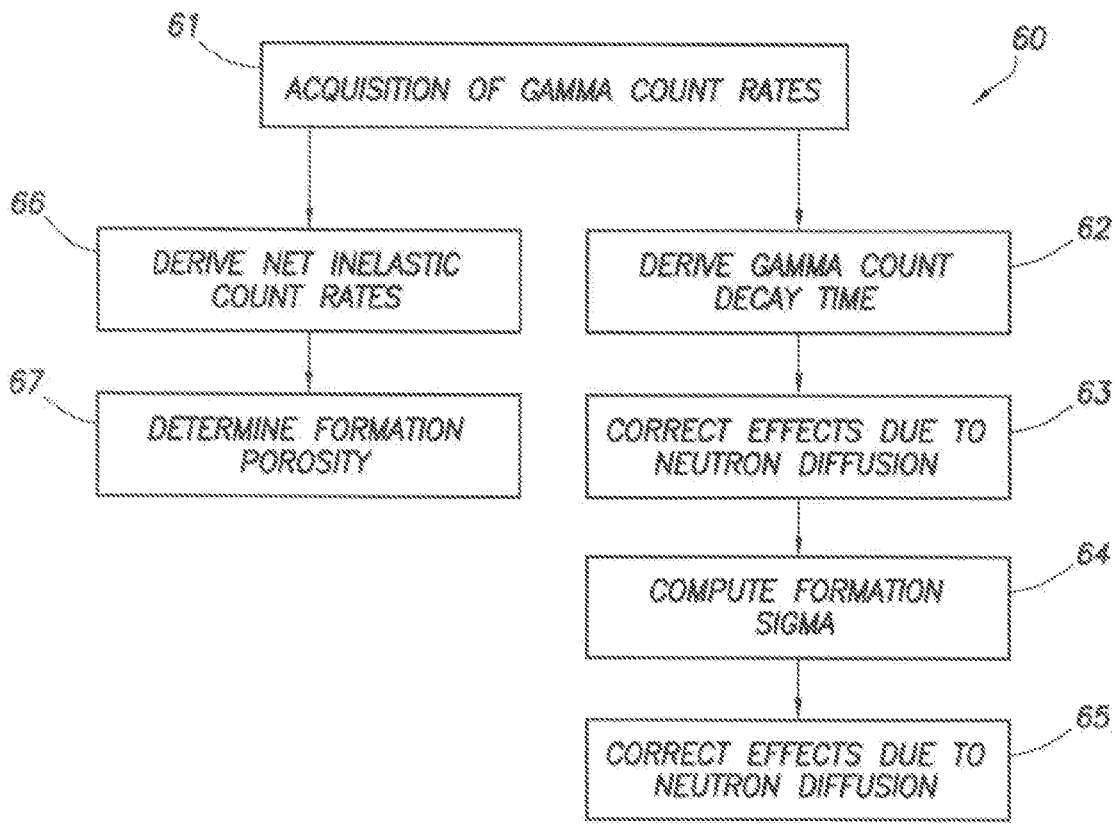
FIG. 6 shows a flow chart of a method in accordance with one embodiment of the invention.
Figure 2:
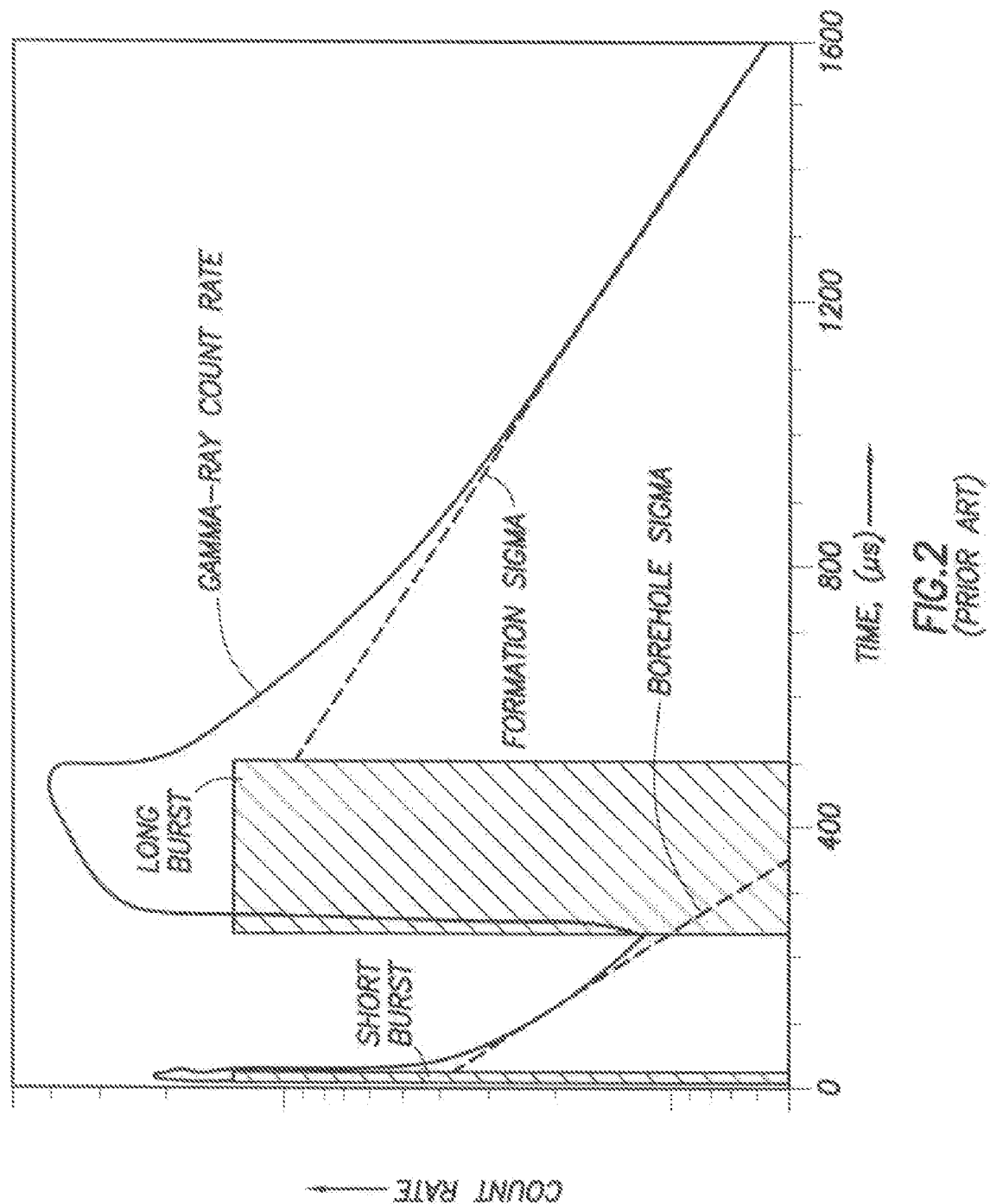
FIG. 2 shows a prior art dual burst pulse sequence for gamma-ray logging.

Embodiments of the invention also relate to methods of formation logging. In accordance with one method 60 of the invention, as shown in FIG. 6, the gamma-ray counts are acquired in various time gates with respect to the start of the bursts (step 61). As noted above, the measurements typically use two or more time windows. Minimally, two gates (time windows) each after the short burst and the long burst are needed to determine an apparent decay time. In a preferred embodiment, multiple gates of constant or varying widths (durations) are used to obtain an accurate representation of the time decay spectrum of the gamma-rays. Alternatively, the entire decay process may be monitored.

The apparent decay time can then be obtained in one of several ways described in the prior art (step 62). This includes fitting of single exponentials over a suitable time interval after the short and long burst or the determination of the 0th and 1st moments of a suitably chosen time interval in the gamma-ray decay to compute the decay time. The decay time determined after the short burst (principally borehole decay) can then be used to correct the formation decay time for the borehole effect.

The decay may then be further corrected for the effect of neutron diffusion (step 63), at this stage or later. Finally, a formation property, such as the borehole and formation sigma, may be computed (step 64). Alternatively, the diffusion correction can be applied to the computed apparent sigma (step 65). The diffusion correction is influenced by the sigma contrast between the formation and the borehole, the porosity of the formation and the borehole and casing configuration.

The porosity information can be derived from the (monitor normalized) net inelastic count rate in the gamma-ray detector (step 67). The net inelastic count rate is the count rate observed during the burst after subtracting the component due to thermal neutron capture gamma-rays (step 66). The required subtraction factor can be determined experimentally during the tool characterization, as known in the art.

In addition to formation porosity, the detected gamma-ray count rates may also be used to derive estimates of formation bulk densities. To do this, count rate(s) from a neutron detector (an epithermal or thermal detector) is/are first used to correct gamma-ray count rates to remove neutron-induced effects in the gamma-ray counts.

One of ordinary skill in the art would appreciate that the above described methods is for illustration only. Other variations and modifications of these procedures are possible without departing from the scope of the invention.

If an epithermal and possibly a thermal neutron detector are added at a density neutral spacing (about 9 to 14 inches [22 to 36 centimeters] from the neutron source) (as in the APSTM tool developed by Schlumbaerger), an accurate determination of the formation hydrogen index is possible in open hole. Using the count rate information from the gamma-detector, the porosity measurement can be extended to cased-hole situations. In order to improve the cased-hole answer further a far (epithermal) neutron detector can be added as described in U.S. Pat. No. 6,032,102. Alternatively, a far thermal detector can be utilized in place of or in addition to the epithermal detector. However, instead of using a ratio of count rates the monitor normalized far count rate is utilized. This normalization can be done as an average but in a more detailed manner it is possible to normalize the neutron output for each time gate during the burst. This eliminates biases caused by the assumption of a square burst, while the actual neutron output may not be constant during the entire burst. This normalization can also be applied to bursts at different times in a timing sequence, which may have different lengths and/or different behavior.

In accordance with some embodiments of the invention, at least one epithermal neutron detector is included in a tool in addition to the gamma-ray detector. One of such tools is shown schematically in FIG. 5. Epithermal neutron detectors, which may be 3He proportional counters, measure the epithermal neutron flux in the formation, typically at a spacing close to the neutron source to minimize the effect of the heavier formation elements (e.g., oxygen, silicon, carbon, calcium, etc.), which dominate bulk density, and to maximize the influence of formation hydrogen on the detector outputs. When properly configured, typical epithermal neutron detector responses will depend primarily on the hydrogen index with only residual effects from formation lithology. To enhance the sensitivity of an epithermal neutron detector to the formation and to reduce borehole influence, the epithermal detectors are preferably located adjacent a drill collar or wireline (slick-line) logging tool wall and back-shielded.

Figure 5:
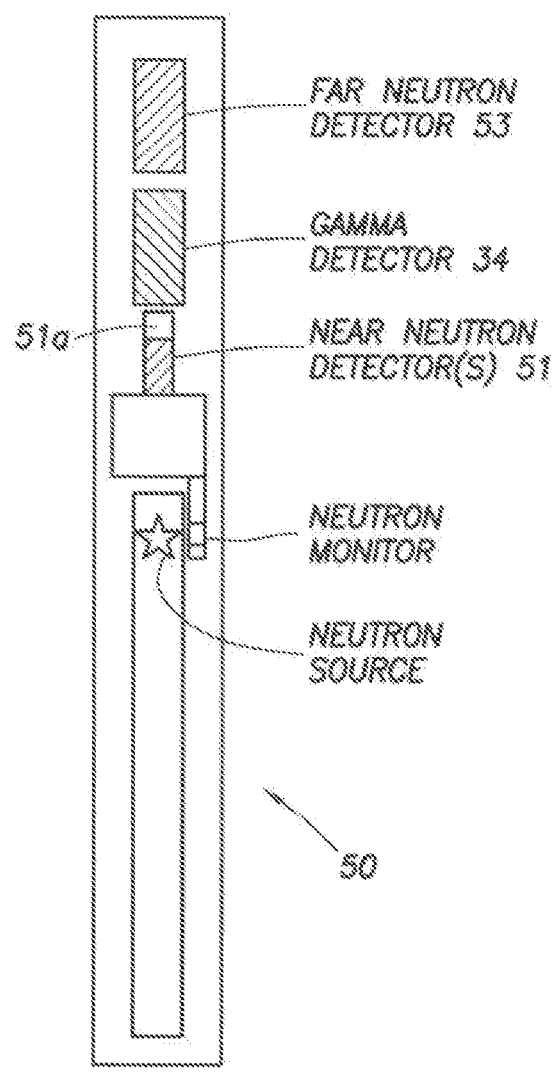
FIG. 5 shows another tool in accordance with one embodiment of the invention.

When compared with the embodiment shown in FIG. 3, the tool in FIG. 5 has one or more neutron detectors inserted between the source and the gamma-ray detector. In accordance with preferred embodiments, at least one epithermal detector 51 is placed at a "density neutral" position between about 9 and 14 in. (22 to 36 cm) from the target. At this distance, the epithermal count rates are predominantly a function of the formation hydrogen index, whereas environmental effects arising from borehole size variations and mud compositions have less impact on the accuracy of the neutron count rates. In addition, the bulk density of the formation does not influence the measurement. The gamma-ray detector 34 may need to be placed at a slightly increased spacing, as compared with a tool with only a gamma-ray detector, in order to accommodate the presence of the neutron detector. Alternatively, if the tool inner diameter allows it, the neutron and gamma-ray detectors can be collocated at the same or similar spacings.

In accordance with some embodiments of the invention, an epithermal detector 51 could optionally be paired with a thermal neutron detector 51a. A thermal neutron detector may likewise be a 3He proportional counter. Thermal neutron detectors 51a are strongly influenced by the borehole signals, in particular, the borehole salinity, Therefore, measurements from a thermal neutron detector may be compared with the epithermal measurements to provide improved borehole compensation and additional borehole information.

With tools shown in FIG. 5, the porosity and the sigma measurements are performed by two different types of sensors. Because these two different types of measurements are influenced by different environmental effects to different extents, these measurements can be used to provide further compensation to each other. For example, contribution of neutron diffusion in the gamma-ray counts can be corrected based on the porosity measurements made with the epithermal detector. Furthermore, with either pulsing scheme shown in FIG. 4, the time intervals after the short bursts can be used for the determinations of the epithermal neutron die-away times (slowing down time=SDT). The SDT measurements may be used to compensate for tool stand off in open holes.

In cased hole, information from the gamma-ray detector may be used to further compensate neutron counts for the presence of an unknown amount of cement of unknown quality. To improve the cased hole measurements, one or more additional epithermal neutron detectors (shown as far detector 53 in FIG. 5) could be used. These additional detectors are preferably placed with a spacing of 24 in. (61 cm) or more from the source. The combination of the absolute count rate answers of the two or more neutron detectors and the SDT of the near detector provides a more accurate through-casing hydrogen index answer. This is similar to the approach described in U.S. Pat. No. 6,032,102. However, in accordance with embodiments of the invention, absolute (i.e. monitor normalized) count rates from these neutron detectors are used, instead of a near/array and a near/far count rate ratios in the prior art.

In accordance with embodiments of the invention, both the near and far neutron detectors may be properly surrounded by shielding material to improve the formation responses and reduce the influence of the borehole signals. Preferred materials for the shielding, for example, include tungsten (shielding of high energy neutrons and gamma-rays), materials containing a high concentration of hydrogen (e.g., Ti hydride or organic compounds) to moderate intermediate energy neutrons (neutrons with an energy below several MeV), and materials containing a high concentration of 10B (either using natural boron, or boron enriched with 10B), cadmium or other neutron absorbers. In preferred embodiments, the shielding materials may be 10B or 10B-loaded materials. Further details concerning the configuration of the individual detectors and their shields are described in more detail in U.S. Pat. Nos. 4,760,252 and 4,972,082.

What is claimed is:

1. A tool for formation logging, comprising:
   a support configured for movement in a borehole;
   a neutron source disposed on the support, the neutron source configured to emit neutrons in bursts having a first duration and a second duration, the first and second durations selected such that respective effects of a wellbore on capture gamma ray counting rates are different for each of the first and second durations;
   a neutron monitor disposed on the support and configured to monitor an output of the neutron source;
   a gamma-ray detector disposed on the support and spaced apart from the neutron source;
   a counter configured to count gamma rays detected by the gamma ray detector in selected time intervals after at least one burst having the first duration and after at least one burst having the second duration; and
   a shielding material disposed between the gamma-ray detector and the neutron source.

2. The tool of claim 1, wherein the neutron monitor is disposed proximate the neutron source.

3. The tool of claim 1, wherein the gamma-ray detector is spaced apart from the neutron source by about 8 to 40 inches.

4. The tool of claim 1, further comprising a neutron detector disposed between the neutron source and the gamma-ray detector.

5. The tool of claim 4, wherein the neutron detector is an epithermal neutron detector.

6. The tool of claim 5, wherein the epithermal neutron detector is spaced from about 9 inches to about 14 inches from the neutron source.

7. The tool of claim 5, further comprising a thermal neutron detector.

8. The tool of claim 7, wherein the thermal neutron detector is disposed proximate the epithermal neutron detector.

9. The tool of claim 5, further comprising one or more additional epithermal or thermal neutron detectors with a spacing from the neutron source further away than a spacing between the gamma-ray detector and the neutron source.

10. The tool of claim 9, wherein the spacing between the neutron source and the one or more additional epithermal or thermal neutron detectors is 24 inches or more.

11. The tool of claim 4, wherein the neutron detector is disposed proximate to the gamma-ray detector.

12. The tool of claim 4, wherein the neutron detector is disposed farther from the neutron source than the gamma-ray detector.

13. The tool of claim 1, wherein the shielding material comprises at least one selected from tungsten, titanium hydride, organic compounds, cadmium, boron, a boron-loaded material, and a thermal or epithermal neutron absorber.

14. A method for formation logging, comprising:

emitting neutrons into a formation from a neutron source disposed on a logging tool in a borehole, the emitting performed in bursts having a first selected duration and a second selected duration, the first and second durations selected such that respective effects of a wellbore on capture gamma ray counting rates are different for each of the first and second durations;

monitoring, using a neutron monitor disposed on the logging tool proximate the neutron source, an output of the neutrons emitted by the neutron source;

measuring, using a gamma-ray detector disposed on the logging tool and spaced apart from the neutron source, count rates of gamma rays scattered by the formation as a result of interactions with the neutrons emitted by the neutron source, the measuring count rates of gamma rays performed at least once after a burst having the first duration and at least once after a burst having the second duration; and normalizing the measured count rates based on the output of the neutrons as monitored by the neutron monitor.

15. The method of claim 14, further comprising determining a formation property from the normalized count rates.

16. The method of claim 15, wherein the formation property is a formation Sigma.

17. The method of claim 15, wherein the formation property is a formation porosity.

18. The method of claim 14, further comprising measuring neutron count rates using at least one epithermal neutron detector disposed on the logging tool.

19. The method of claim 18, further comprising determining a formation porosity from the epithermal neutron count rates.

20. The method of claim 18, further comprising: correcting the normalized count rates of gamma rays for neutron-induced effects by using the epithermal neutron count rates; and determining a formation density from the normalized, corrected count rates of gamma ray.

21. The method of claim 20, further comprising determining a neutron slowing down time.

22. The method of claim 21 further comprising determining a porosity from the neutron slowing down time.

23. The method of claim 21, further comprising determining a stand off from the epithermal count rates and the neutron slowing down time.

24. The method of claim 18, further comprising using the count rates from the gamma rays to correct the neutron count rates.

25. The method of claim 24, further comprising deriving a formation property from the corrected neutron count rates.

26. The method of claim 14, further comprising measuring neutron count rates using at least one thermal neutron detector disposed on the logging tool.

27. The method of claim 26, further comprising determining a formation porosity from the thermal neuron count rates.

28. The method of claim 26, further comprising: correcting the normalized count rates of gamma rays for neutron-induced effects by using the thermal neutron count rates; and determining a formation density from the normalized, corrected count rates of gamma ray.

29. The method of claim 26, further comprising determining a formation sigma from die-away of the thermal neutron count rates.

30. The method of claim 14, further comprising measuring neutron count rates using at least one epithermal and a least one thermal detector.

31. The method of claim 30, further comprising determining a borehole salinity from the thermal and epithermal neutron count rates.

* * * * *